May 3, 1927. Re. 16,616
H. HOVLAND
AUTOMATIC COIN SERVICE TELEPHONE SYSTEM
Original Filed May 1, 1925
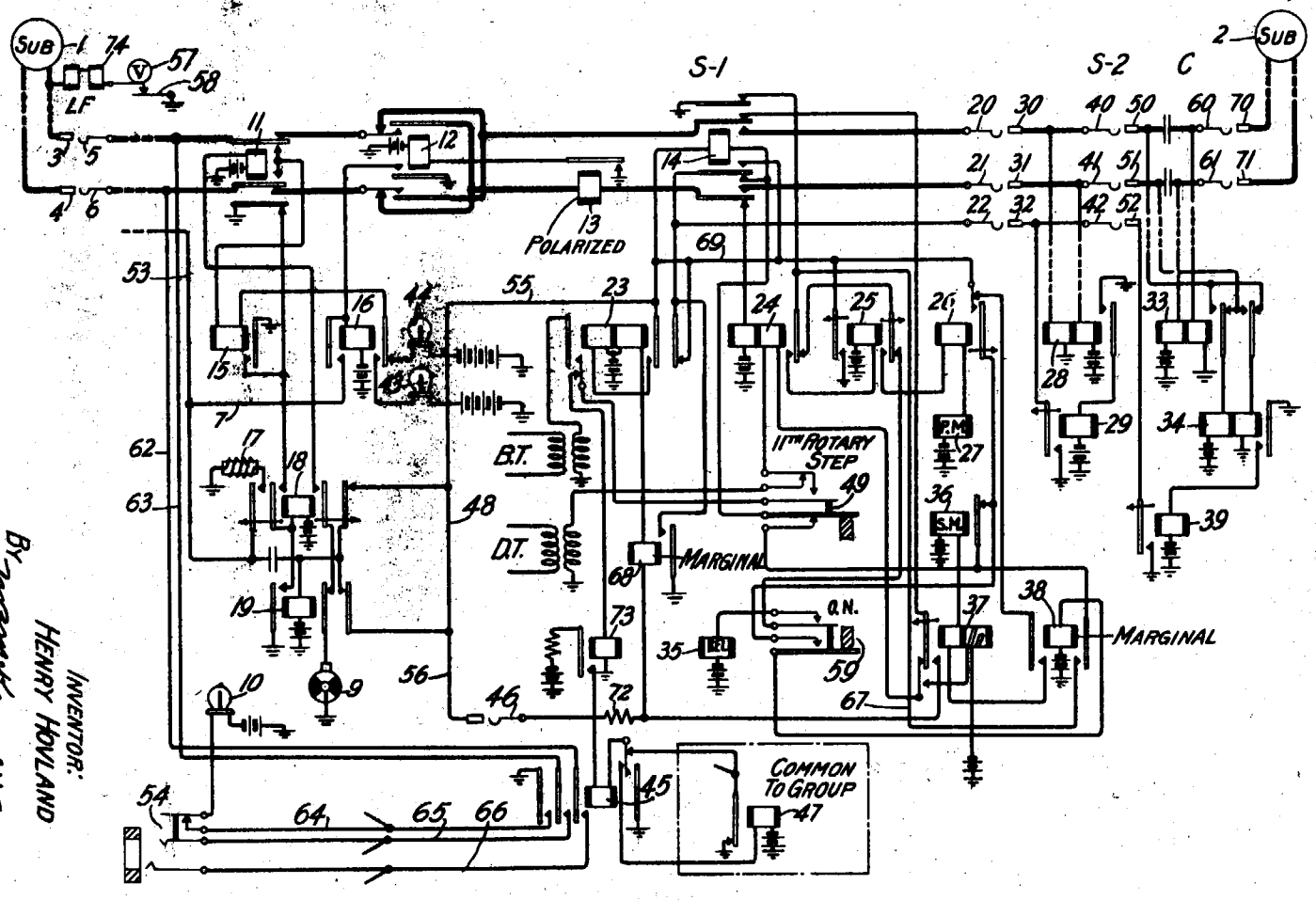
INVENTOR:
HENRY HOVLAND
BY W. M. McKenney
ATTORNEY.

Reissued May 3, 1927. Re. 16,616

UNITED STATES PATENT OFFICE.

HENRY HOVLAND, OF FLUSHING, NEW YORK, ASSIGNOR, BY MESNE ASSIGNMENTS, TO WESTERN ELECTRIC COMPANY, INCORPORATED, OF NEW YORK, N. Y., A CORPORATION OF NEW YORK.

AUTOMATIC COIN-SERVICE TELEPHONE SYSTEM.

Original No. 1,605,952, dated November 9, 1926, Serial No. 27,169, filed May 1, 1925. Application for reissue filed March 23, 1927. Serial No. 177,778.

This invention relates to machine switching telephone exchange systems and more particularly to systems employing grounded signaling from substations and wherein substations are provided with coin boxes.

The object of this invention is to provide improved means for controlling the establishment of calls from prepayment lines and particularly to provide a selector circuit which will not permit a connection to be built up to a charge line under control of the calling line dial unless a coin is first deposited, and which will in that case route the connection automatically to an operator. Provision is further made in the selector circuit so that if the calling station desires to call a zero operator, for example, the connection may be established without first depositing a coin.

In accordance with this invention all lines are reached via a certain group of selector switches, the ordinary lines by way of certain levels of said switches, and the free lines by certain other levels of said switches, each switch being provided with a test relay which is responsive to the deposit of a coin at the calling substation on calls to an ordinary line. This relay, in responding, prepares the switch to extend the connection to a subsequent switch or switches of the train. On calls to free lines or zero operators' positions, an alternative circuit is provided for causing said test relay to respond and permit the establishment of a connection with a free line. If for any reason the test relay does not respond, the selector switch advances to a setting known as the 11th rotary step position where it remains until the calling subscriber disconnects.

In the drawing, which comprises but a single sheet, are disclosed a calling subscriber's station represented at 1 and a typical called subscriber's station at 2. The selector switch $S^1$ is wired in accordance with this invention and has access to other selector switches such as shown at $S^2$ which in turn select a connector such as C. Shown on the lower part of the figure is a trunk to a zero or special operator's position which is under control of selector switch $S^1$. The new features of this invention will be more easily understood from the detailed description of the operation as follows:

*A call for which prepayment is required.*

When the receiver is removed from the switchhook at subscriber's station 1, the brushes 5 and 6 of line finder LF will connect with the terminals 3 and 4 in a manner well known to the art, and extend the connection through to selector switch $S^1$. A circuit is now closed from battery through the left winding of relay 24, lower back contact of relay 14 through the winding of polarized relay 13, lower back contact of relay 12, lower back contact of relay 11, brush 6, terminal 4, subscriber's station 1, terminal 3, brush 5, upper back contact of relay 11, upper back contact of relay 12, upper inner back contact of relay 14, left back contact of relay 37, right winding of relay 24, upper normal contact of 11th rotary step switch 49 through the winding of dial tone coil DT to ground, thereby giving the calling subscriber 1 a dial tone. Polarized relay 13 does not operate at this time. Relay 24 operated, closes an obvious circuit for the operation of relay 25. The operation of relay 25 closes a circuit from ground on its left front contact, conductors 69 and 55, outermost right back contact of relay 18 to battery through the winding of relay 19. Relay 19 operated, locks over a circuit from battery through its winding, outer right front contact, conductors 48, 55 and 69 to ground on the left front contact of relay 25. Relay 19 operated, renders interrupter 9 inoperative and closes an obvious circuit for the operation of relay 18 which locks under control of relay 11 and connects ground through retardation coil 17 and its outer left front contact over conductor 53 to the line finder LF thereby preventing the line finder LF from releasing.

The dial at the calling station 1 is now operated and released in accordance with the first digit of the number of the called line. As the dial returns to normal, the loop of the calling subscriber's station 1 is interrupted, thus producing impulses in the impulse circuit which includes relay 24. When relay 24 releases, a circuit is completed from battery through the winding of primary magnet 27, relay 26, right front contact of relay 25, right back contact of relay 24 to ground on the upper back contact of relay 14. Relays 25 and 26 are slow to release relays, therefore, they will remain operated during the dialing period. Each time primary magnet 27 operates, brushes 20, 21 and 22 are advanced one step until the number of impulses corresponding to the first digit have been received. During the first step of the selector switch, the off-normal spring combination 59 is closed, closing a circuit for the operation of marginal relay 38, which may be traced from battery through the winding of relay 38, lower alternate contacts of off-normal spring 59, alternate contacts of relay 26 to ground at the left front contact of relay 25. Relay 38 locks under control of relay 14 over a circuit from ground on its upper outer back contact, conductor 67, right front contact of relay 38, back contact of magnet 36 and thence over the circuit hereinbefore traced through the winding of relay 38 to battery.

When the dial at the calling subscriber's station 1 returns to normal, relay 24 remains operated and relay 26 releases. Relay 26 released, closes a circuit for operating secondary magnet 36 from battery through its winding, left winding of relay 37, left front contact of relay 38, back contact of relay 26 to ground on the left front contact of relay 25. The operation of secondary magnet 36 advances the brushes 20, 21 and 22 one step. Relay 37 operates in the above traced circuit and establishes a circuit from battery through the right winding of relay 23, winding of marginal relay 68, front contact of relay 37, inner upper back contact of relay 14, upper back contact of relay 12, upper back contact of relay 11, brush 5, terminal 3 to ground on spring 58, providing the calling subscriber has deposited the coin in the coin box. Relay 23 operates as a test relay and cannot operate unless the ground condition caused by the coin 57 is found at the subscriber's station 1. Marginal relay 68 cannot operate in this circuit because of the resistance of the coin magnet 74. Relay 23 operated, locks to ground over a circuit from battery through its left winding, and inner right front contact to ground on the left front contact of relay 25. The operation of secondary magnet 36 opens the locking circuit hereinbefore traced for marginal relay 38, which releases, in turn opening the operating circuit for secondary magnet 36 and relay 37. Relay 37 being slow releasing does not retract its armature during brief interruptions of its circuit.

Brushes 20, 21 and 22 of the selector switch $S^1$ are now resting on the terminals associated with the first trunk in the selected trunk level. We will assume that this trunk is busy, in which case ground is connected from the front contact of a relay similar to relay 29, thence to terminal 32, brush 22, inner lower back contact of relay 14, lower normal contact of 11th rotary step of off-normal switch 49, back contact of secondary magnet 36, lower contact of off-normal switch 59 to battery through the winding of marginal relay 38. The operation of marginal relay 38 closes the circuit previously described for operating secondary magnet 36. The operation of the secondary magnet 36 causes brushes 20, 21 and 22 to step one step in their secondary motion. This operation continues until an idle trunk is found, at which time no ground is found on terminal 32 and secondary magnet 36 remains deenergized, closing a circuit for operating relay 14 in series with marginal relay 38 over a circuit from battery through the winding of relay 38, lower contact of off-normal spring 59, back contact of magnet 36, lower normal contact of 11th rotary step switch 49 through the winding of relay 14, conductor 69 to ground on the left front contact of relay 25. It will be observed that as long as brush 22 was in contact with a busy trunk, a short circuit was connected around the winding of relay 14 but when an idle trunk was found the short circuit was removed, permitting relay 14 to operate in series with marginal relay 38. Relay 38 being marginal does not operate due to the high resistance of the winding of relay 14. Relay 14 operates and opens the pulsing leads and closes the talking leads through the brushes 20 and 21. Relay 24 releases, in turn releasing relay 25, but the latter, being slow to release, remains operated long enough to allow sufficient time for the operation of relay 28 over the subscriber's loop which in turn operates relay 29. Relay 29 connects ground to terminal 32, thereby replacing the ground on the left front contact of relay 25, which is later removed by the release of this relay.

Selector switch $S^2$ is operated in the same manner as selector switch $S^1$ with the exception that the impulse relay 28 is used for setting the switch mechanism (not shown). Brushes 40, 41 and 42 of selector switch $S^2$ are set on terminals 50, 51 and 52 of connector C and the impulse relay 34 is operated in series with the calling subscriber's loop and closes an obvious circuit for the operation of slow to release relay 39 which connects ground from its front contact to contact 52, providing a busy condition to other selector switches as well as holding switches $S^1$ and $S^2$ in their operated positions.

The polarized relay 13, which is in series with the various impulse relays 24, 28 and 34, in succession, does not operate because the current flow through its winding is not in the proper direction. The called subscriber at substation 2 is now signaled in any desired manner and when the receiver is removed from the switchhook the circuit is closed from battery through the left-winding of relay 33 through brush 61, terminal 71 through the subscriber's loop, terminal 70, brush 60 to ground, through the right winding of relay 33, thereby operating relay 33 and reversing the direction of current flow in the loop circuit of subscriber's station 1 which is in series with the impulse relay 34. Polarized relay 13 operates in this circuit, closing an obvious circuit for the operation of relay 12. Relay 12 in turn closes an obvious circuit for the operation of relay 16 which locks under control of relay 18 in a circuit from battery through its winding, left front contact, conductor 7, outer left front contact of relay 18 through the retardation coil 17 to ground. The operation of relay 12 reverses the talking leads through its contacts.

When the receiver at substation 1 is replaced on the switchhook, relay 34 releases in turn releasing relay 39. The release of relay 39 removes ground from the test terminals 32 and 52, thereby permitting the release of relays 14, 19 and 23. The release of relay 14 opens the talking leads and closes a circuit for operating release magnet 35 from battery through the winding of the magnet, upper contact of off-normal spring 59, right back contact of relay 25, right back contact of relay 24 to ground on the upper outer contact of relay 14. The operation of release magnet 35 restores the brushes of selector switch $S^1$ to normal. The release of relay 19 closes a circuit under the control of relay 18 from battery through the winding of relay 11, inner right front contact of relay 18, inner right back contact of relay 19 to ground through interrupter 9. Relay 11 operated connects ground from the contact of coin mechanism 58 through terminal 3, brush 5, upper front contact of relay 11, winding of relay 15, right front contact of relay 16 through lamp 43 to coin collect battery, operating the coin magnet 74 at station 1. This circuit will operate relay 15 providing coin 57 is present. Relay 15 operated will provide a new holding circuit for relay 18 which is a slow to release relay so that it will remain operated long enough to allow relay 15 to provide the substitute ground. When the brush of interrupter 9 encounters an insulated segment, relay 11 will release, removing the coin collect current from the calling substation 1, thus permitting the coin mechanism 58 to restore and remove the ground previously provided under control of coin 57. When interrupter 9 again reaches a metal segment, relay 11 will reoperate again connecting coin collect current to the line. If the coin has been properly disposed of, the absence of the coin at calling substation 1 prevents relay 15 from operating and after an interval of time relay 18 will release, thereby removing ground from the sleeve of line finder LF, thereby permitting it to release in a well known manner. When the relay 18 releases it opens the circuit of relay 11 and the circuit is restored to normal.

*Ordinary call—no coin deposited.*

Let us assume that the calling substation 1 initiates an ordinary call, that is, a call for which a charge is made but fails to deposit a coin before operating the dial at the calling substation 1.

Under these circumstances, the circuit functions in the manner above described until at the end of the primary movement of selector switch $S^1$ the test relay 23 has been connected to one conductor of the calling line loop under the control of relay 37. No coin having been deposited at the calling substation 1, the contacts of the coin mechanism 58 will not be closed; therefore ground will not be connected to the circuit for relay 23 which will not operate and a circuit will be closed from ground on the left front contact of relay 25, over the outer right back contact of relay 23, which will be equivalent to a busy condition upon test terminal 32, and the secondary magnet 36 and marginal relay 38 will operate in the manner described above, and the brushes 20, 21 and 22 will advance until the last trunk in the group has been passed over and the brushes are set in what is termed, the eleventh rotary step position. In this position, a circuit will be closed from ground through relay 73, left back contact of relay 23, alternate contact of eleventh rotary step spring combination 49 through the winding of relay 24, left front contact of relay 37 to battery through the right non-inductive winding of relay 37. On release of relay 37 the relays 24 and 73 are held by a circuit leading from ground through relay 73, left contact of relay 23, make contact of springs 49, right winding of relay 24, back contact of relay 37, thence over the line as traced. Relay 73 operates in this circuit, in turn operating relay 45 in an obvious circuit to ground on the back contact of relay 47 if the operator is not at the time engaged with another call from the group of selectors and relay 47 is not energized. The operation of relay 45 closes a locking circuit for itself, closes the circuit of group relay 47 to prevent other calls from being routed to the jack 54, and also closes leads 62 and 63 through to leads 65 and 66 connected respectively to tip and ring springs of jack 54, and lights lamp 10 over an obvious circuit. Jack 54 and lamp 10 appear before a special operator who, upon noting the lighting of lamp 10, inserts the plug of an operator's telephone circuit (not shown) into jack 54, thereby extinguishing lamp 10 and connecting herself directly through to the subscriber at substation 1. She then notifies the calling subscriber of the failure to deposit a coin and advises that the call be made again in the proper manner.

*Coin deposit simulated.*

If an attempt be made to simulate the deposit of a coin by connecting a direct ground to the line at the substation then when the coin test circuit is established as previously traced through the test relay 23 and marginal relay 68, since a direct ground exists at the substation, marginal relay 68 energizes with relay 23. Relay 68 operated, connects ground to the test brush 22 which will be equivalent to a busy condition upon the test terminals of all trunks of the group, whereupon connection will be established with the operator's position as previously described.

*Calls to free lines.*

It will be assumed that all free lines, such as trunks to zero operators' positions, are reached through the 10th level of selector $S^1$. If therefore, the subscriber at substation 1 desires such a free call, it is only necessary that he dial the digit 10 without depositing a coin. The selector $S^1$ is advanced in the manner described by the primary magnet 27 to position the brushes 20, 21 and 22 opposite the tenth level of bank terminals. In this position trunk hunting is started and since the tenth level contacts 46 are now closed, relay 23 operates in a circuit from battery through the windings of relays 23 and 68, resistance 72 which simulates the resistance of a coin magnet, contacts 46, conductors 56, 48 and 55, to ground at the left contact of relay 25. With relay 23 operated the selector switch proceeds to hunt for and connect with an idle trunk in the tenth level in the manner previously described.

What is claimed is:

1. In a telephone system, calling lines having switch-controlling devices, means associated with each calling line operable to establish various circuit conditions thereon, called lines classified as charge lines, switching mechanism controllable by a calling line controlling device to build up a connection to any desired called line, an operator's position, means under the control of said first means for preventing said switching mechanism from functioning in accordance with its normal mode of operation to build up a connection, and means for completing a connection from one of said calling lines to said operator's position should the switching mechanism be prevented from functioning in accordance with its normal mode of operation.

2. In a telephone system, calling lines, a coin control device associated with each calling line, called lines classified as charge lines, switching mechanism controllable by a calling line to build up a connection to any desired called line, an operator's position, means for preventing said switching mechanism from functioning in accordance with its normal mode of operation to build up a connection if conditions are established on said calling line in simulation of the deposit of a coin in said coin device, and means for completing a connection from said calling line to said operator's position should said switching mechanism be prevented from functioning in accordance with its normal mode of operation.

3. In a telephone system, calling lines, coin control devices associated with each calling line, called lines classified as charge lines, switching mechanism controllable by a calling line to build up a connection to any desired called line, an operator's position, means for preventing said switching mechanism from functioning to extend a desired connection should the subscriber at one of said calling lines fail to deposit a coin in said control device and means for completing a connection from one of said calling lines to said operator's position when the switching mechanism is prevented from functioning in accordance with its normal mode of operation.

4. In a telephone system, calling lines, coin control devices associated therewith, called lines classified as charge lines, numerical and non-numerical switches operable in sequence under control of a calling line to build up a connection to any desired called line, the first numerical switch in this train having both a primary and a secondary movement, an operator's position, means for causing said first numerical switch to move in a complete secondary movement without trunk hunting should the subscriber at one of said calling lines fail to deposit a coin in said coin device, and means at said first numerical switch effective at the end of the secondary movement for connecting said operator's position to said calling line.

5. In a telephone system, calling lines, a coin control device associated with each line, called lines classified as charge lines, a train of automatic switches operable under control of a calling line to build up a connection to any desired called line, one of the switches in said train having both a primary and secondary movement, an operator's position, means for preventing said last mentioned switch from functioning in accordance with its normal secondary movement and to cause it to hunt to the end of the switch bank should the subscriber at one of said calling lines fail to deposit a coin in said coin device, and a relay in said last mentioned switch effective at the end of the secondary movement thereof for connecting said operator's position to said calling line.

6. In a telephone system, calling lines, a coin control device associated with each line, called lines, a train of automatic switches operable under control of a calling line to build up a connection to any desired called line, one of said switches having a primary movement to select groups of outgoing trunks and a secondary movement to select an idle trunk in a selected group, an operator's position, a relay in said switch responsive to the deposit of a coin in the control device of a calling line to permit the normal secondary movement of said switch and effective to cause said switch to move in its secondary movement without trunk hunting to a position beyond the last trunk in the selected group if no coin has been deposited, and means thereupon effective to connect the calling line with said operator's position.

7. In a telephone system, calling lines, a coin control device associated with each line, called lines, a train of automatic switches operable under control of a calling line, to build up a connection to any desired called line, one of said switches having a primary movement to select groups of outgoing trunks and a secondary movement to select an idle trunk in a selected group, an operator's position, means in said switch responsive to the deposit of a coin in the control device of a calling line to permit the normal secondary movement of said switch and effective to cause said switch to move in its secondary movement without trunk hunting to a position beyond the last trunk in the selected group if no coin has been deposited, means thereupon effective to connect the calling line with said operator's position, and means to prevent the concurrent connection of more than one calling line with said operator's position.

In witness whereof, I hereunto subscribe my name this 14 day of March, 1927.

HENRY HOVLAND.